July 11, 1967

S. J. MARKOWSKI 3,330,115

TURBOFAN THRUST REVERSER

Filed May 31, 1966

INVENTOR
STANLEY J. MARKOWSKI

BY Fishman + Van Kirk

ATTORNEYS

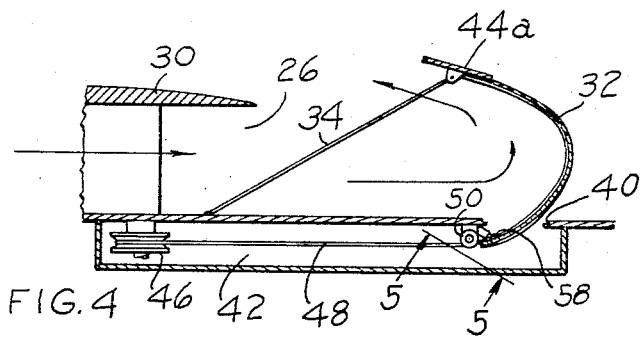
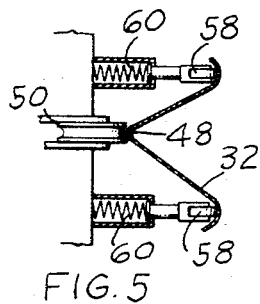
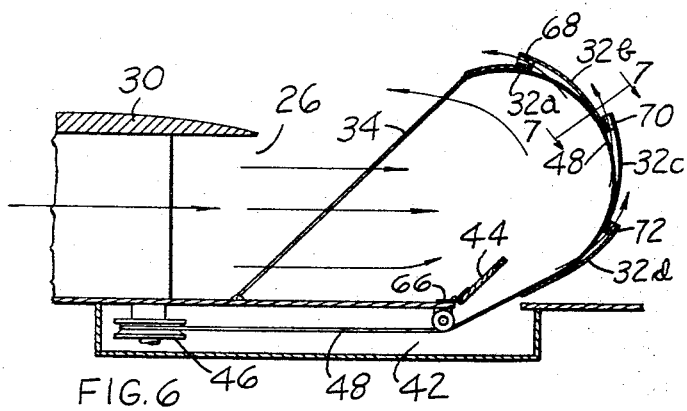
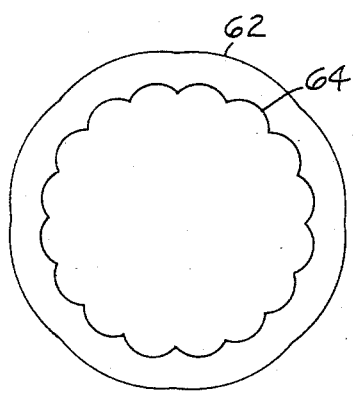
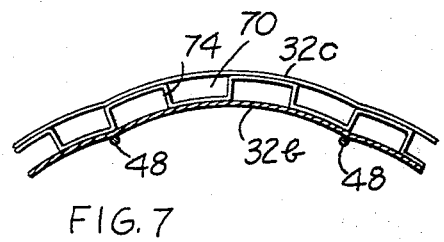

United States Patent Office 3,330,115
Patented July 11, 1967

3,330,115
TURBOFAN THRUST REVERSER
Stanley J. Markowski, East Hartford, Conn., assignor to United Aircraft Corporation, East Hartford, Conn., a corporation of Delaware
Filed May 31, 1966, Ser. No. 554,036
16 Claims. (Cl. 60—230)

This invention relates to a thrust reversing mechanism for a gas turbine jet engine. More particularly, this invention relates to a parachute type structure of flexible material employed as a thrust reverser for the fan air flow of a front fan type turbofan engine in which the fan discharges air along the main engine nacelle from an annular discharge passage forward of the aft end of the engine.

In the ordinary type of turbojet engine it is possible to reverse the engine thrust by merely reversing the direction of flow of the turbine exhaust gases which are normally discharged rearwardly to the atmosphere to generate thrust. Reference may be had to U.S. Patents Nos. 2,780,057, 2,803,944, 2,838,909, 2,841,956, 2,874,538, and 3,019,600 for suitable thrust reversers for the ordinary type of turbojet engine. However, thrust reversal in a front fan type turbofan engine cannot be efficiently accomplished with similar type structure in view of the large volume of air passing through the fan discharge.

A large volume of relatively cool and relatively low velocity air compared to the main engine air is discharged from the fan to atmosphere for thrust generation purposes. The volume of air discharged to atmosphere from the fan section may even be five times as great as the volume of air passing through the main engine, and this fan discharge may be responsible for a large portion of total engine thrust. Hence, unless effective steps are taken, the fan discharge will continue to generate forward thrust when the main engine turbine exhaust gases are being reversed.

As the volume of fan air becomes greater, the problems associated with fan air reversal become correspondingly more difficult. Since the fan structure is located around the main engine nacelle, the fan reversing structure must be of relatively large size, and its size must increase as the volume of air it must handle increases. To use metal elements for reversing the fan air would require a large weight of reverser structure, with the obvious disadvantages of the added engine weight. Still another problem, which becomes of increasing concern as fan reverser structure increases in size, is that of protecting the fan reverser structure from adverse effects resulting from exposure of the fan reverser structure to reversed gases from main engine thrust reversal.

The present invention employs a parachute type foldable fabric baffle for reversing fan air. The baffle or chute is mounted on the main engine housing downstream of the discharge from the fan section, the baffle being in the form of annular chute around the main engine housing. Since the annular chute is of a fabric type material, the reverser baffle can be made of large size to accommodate a large volume of fan air without incurring serious weight penalties. Also, the flexibility of the fabric material makes the entire reverser structure suitable for the employment of relatively simple reel type actuating mechanism. Both the fabric nature of the chute reverser and the reel type actuating mechanism contribute to lightweight design which is always of extreme importance in aircraft installations.

The flexibility of the actual reverser structure also lends itself to a highly effective and simple overlapping fluted structure for delivering a cooling air flow to the back side of the fan reverser structure. This cooling air delivered to the back side of the fan reverser structure is of extreme importance in protecting the fan reverser structure from possible adverse effects caused by the impingement of main engine reverser flow on the back side of the fan reverser structure. This protective cooling flow for the fan reverser structure is realized in the present invention from the fan air itself without any significant complication in the structure of the fan reverser mechanism.

Accordingly, one object of this invention is to produce a novel thrust reverser for a turbofan engine in which the fan air is reversed by chute-like structure positioned around the main engine housing downstream of the discharge from the fan section.

Another object of the present invention is to produce a novel thrust reverser for a turbofan engine wherein the fan air is reversed by a flexible chute-like device positioned around the main engine housing downstream of the discharge end of the fan.

Still another object of the present invention is to produce a novel thrust reverser for a turbofan engine wherein a very large volume of fan air is reversed by relatively lightweight structure positioned around the main engine housing downstream of the discharge end of the fan.

Still another object of the present invention is to produce a novel thrust reverser for a turbofan engine wherein in the reversing structure is a chute-like flexible element, and wherein the reverser structure is moved from an operative position to a stowed position by reeling in cords extending from the reverser chute.

Still another object of the present invention is to produce a novel thrust reverser for a turbofan engine wherein the reverser structure is a flexible chute-like element, and wherein mechanism is provided for folding the flexible chute-like element in a stowed position.

Still another object of the present invention is to produce a novel thrust reverser for a turbofan engine wherein the reverser structure is a flexible chute-like element, and wherein the fan reverser structure is protected against damage from impingement by reversed main engine gases.

Still another object of the present invention is to produce a novel thrust reverser for a turbofan engine wherein the fan reversing structure has provision for flowing reversed fan air over the back side of the reverser structure to protect the fan reverser structure from reversed main engine gases.

Still another object of the present invention is to produce a novel thrust reverser for a turbofan engine wherein the fan reverser structure is a fluted flexible material to allow for the passage of reversed fan air over the back side of the fan reverser structure to protect the fan reverser structure from reversed main engine gases.

Other objects and advantages will be apparent from the accompanying drawings and description wherein like parts in the several figures are similarly numbered.

In the drawings:

FIGURE 4 is a view similar to FIGURE 3 showing an alternative arrangement for reverser structure suitable for use in FIGURE 1.

FIGURE 5 is a view along line 5—5 of FIGURE 4.

FIGURE 6 is another view similar to FIGURE 3 showing another alternative structure suitable for use in the thrust reverser of FIGURE 1.

FIGURE 7 is a view along line 7—7 of FIGURE 6.

FIGURE 8 is a view looking upstream into the reverser element of FIGURE 1 and showing the reverser element in both a fully extended position and a partially extended position.

Figure 1:
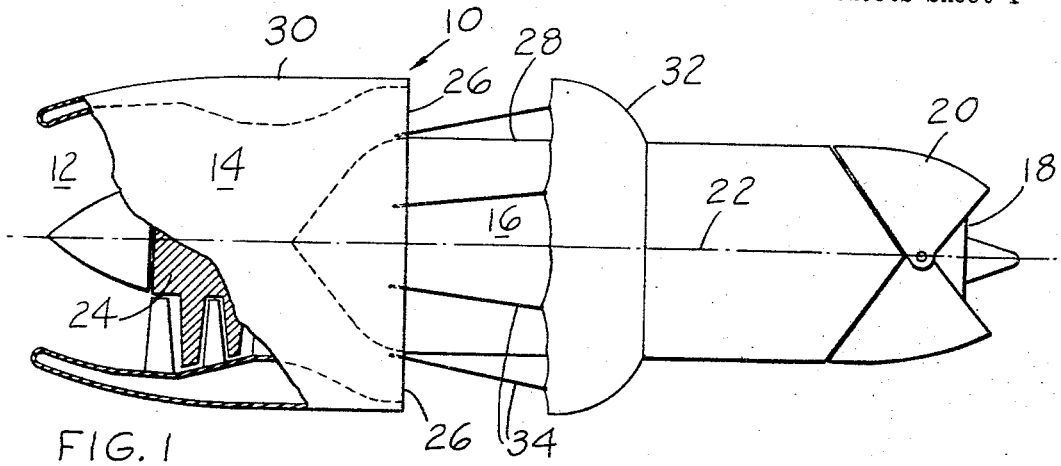
FIGURE 1 is a side elevation view of a turbofan engine showing the fan thrust reverser of the present invention.

Referring now to FIGURE 1, a turbofan engine 10 has an air inlet section 12, a fan or bypass section 14, and a main engine section 16. The well known general structure of main engine section 16 includes a compressor section, a burner section downstream of the compressor section, and a turbine section downstream of the burner section. The discharge end 18 of the main engine section is downstream of the turbine section, and the discharge end of the main engine section supports main engine section reverser structure 20. Engine 10 is of generally circular cross section about axis 22.

With respect to the operation of turbofan engine 10, air enters air inlet section 12, and then passes through a compressor 24 in fan section 14. Part of the air passing through compressor 24 passes into an annular discharge chamber 26 formed between a housing 28 for main engine section 16 and a housing 30 for fan section 14, and is then discharged to atmosphere. The remaining part of the air from compressor 24 passes into main engine 16 where it is compressed in its compressor section, heated in its burner section, has energy extracted therefrom in its turbine section to drive both its own compressor section and fan compressor 24, and is thence passed rearwardly through discharge end 18 to atmosphere for the generation of forward thrust. Additional forward thrust is generated from turbofan engine 10 by the air passing directly from compressor 24 through annular discharge chamber 26 to atmosphere, the air passing through discharge chamber 26 having been compressed but not heated through the burning of any fuel therein. Fan section 14 and main engine section 16 may be designed to provide any desired proportional relationship between the volume of air discharged through discharge chamber 26 and the volume of air passing through main engine 16.

Gases, including compressed air from chamber 26 and combustion gases from discharge end 18 are discharged rearwardly (to the right as shown in FIGURE 1) to produce forward thrust for the engine. When thrust reversal is desired, main engine clam shell reverser 20 can be actuated so that it will act in a known manner to deflect the main engine exhaust gases at least partly toward the front of engine 10.

Figure 2:
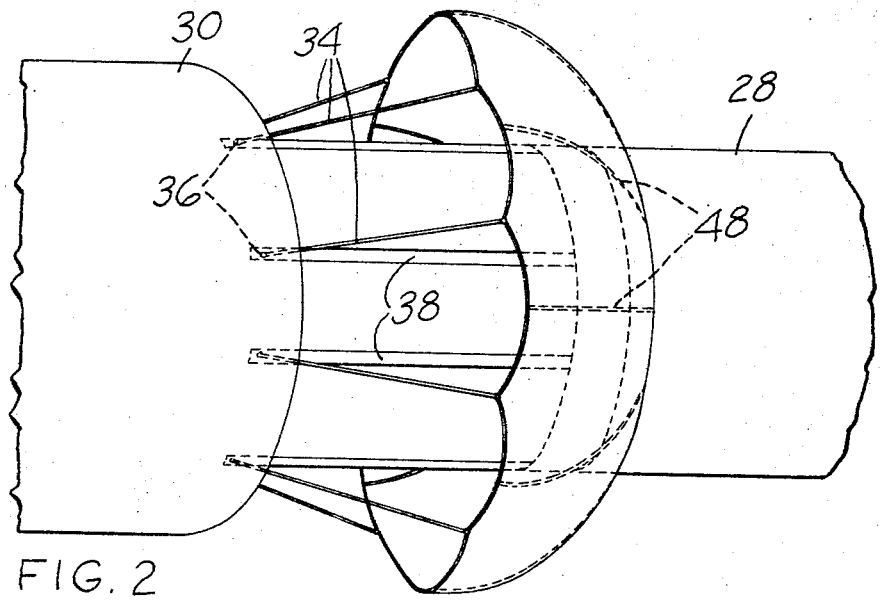
FIGURE 2 is a perspective view of the fan thrust reverser structure of FIGURE 1.

The structure of the present invention for providing thrust reversal to the fan air is shown in the operative position in the elevation view of FIGURE 1 and in the respective view of FIGURE 2. The fan air reverser structure is comprised of a flexible fabric chute-like element 32 which, in the operative position, is disposed in the form of an annulus about main engine housing 28 downstream of the discharge end of annular discharge chamber 26. Since the air to be reversed by fabric element 32 is relatively cool and of relatively low velocity, fabric element 32 can be made, for example but not by way of limitation, of canvas, metallic reinforced canvas, Fiberglas fabric, or flexible metallic fiber cloth.

As shown in FIGURES 1 and 2, one end of flexible element 32 is connected at intervals to tension rods 34, tension rods 34 being spaced apart around main engine housing 28 and being connected to main engine housing 28 at pivots 36. When the reverser structure is in the operative position as shown in FIGURES 1 and 2, tension rods 34 are disposed at an angle to main engine housing 28; when the reverser structure is stowed by retracting flexible element 32, tension rods 34 pivot clockwise toward main engine housing 28 and eventually come to rest in matching recessed axial grooves 38 disposed about the periphery of main engine housing 28. For the purpose of facilitating further discussion, and for the sake of simplifying the other figures of the drawings, grooves 38 are shown only in FIGURE 2.

Figure 3:
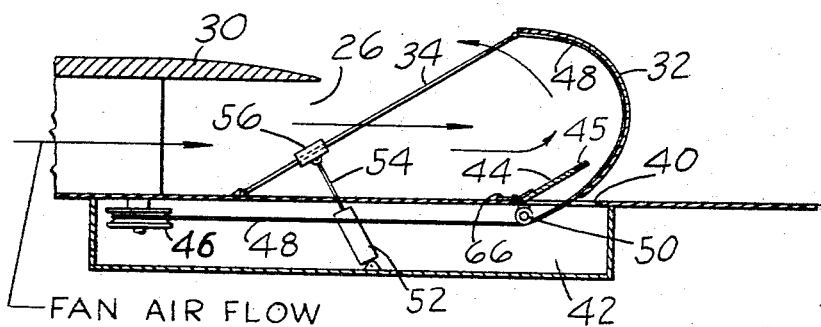
FIGURE 3 is an enlarged fragmentary sectional view of one form of reverser mechanism suitable for use with the structure of FIGURE 1.

Referring now to FIGURE 3, an opening 40 in main engine housing 28 leads to a storage chamber 42, access to storage chamber 42 being had by way of a door 44. Of course, opening 40, storage chamber 42 and door 44 extend around the periphery of main engine housing 28. As will be illustrated hereinafter, door 44 may be spring loaded open. A reel 46, which may be driven by any suitable means (not shown) is shown mounted within storage chamber 42. A cord 48 is connected at one end thereof to reel 46, and the other end of cord 48 passes along a guide pulley 50 and is connected to flexible element 32. As can be seen in FIGURE 3, cord 48 is secured, by stitching or any other convenient means, to the entire front portion of flexible element 32 to form a rib on flexible element 32. There are a number of pulleys 46 disposed in storage chamber 42 about the periphery of the engine, and each reel 46 has an associated cord 48 which is attached to and forms a rib on flexible element 32. A number of such ribs formed from cords 48 are shown in FIGURE 2.

Flexible element 32 would normally be stowed in storage chamber 42, having been reeled into chamber 42 by reels 46 and cords 48, and tension rods 34 would extend along main engine housing 28 and would bear against and keep door 44 closed. Either a flexible rubber tip 45 or a gap between door 44 and the rear border of opening 40 would prevent damaging interference between door 44 and flexible element 32. In order to extend flexible fabric chute element 32 to the operative reversing position, an appropriate signal is delivered to an actuating cylinder 52 which drives an actuating rod 54 which is in turn pivotably connected to a sliding collar 56 on tension rod 34, there preferably being a cylinder 52, a rod 54 and a collar 56 associated with each of the tension rods 34. The appropriate signal extends rod 54 and starts a counterclockwise rotation of the tension rods 34. As the tension rods 34 move counterclockwise they pull on flexible fabric element 32 to start to draw element 32 out of storage chamber 42, door 44 pivoting counterclockwise to open through the combined effect of the removal of the restraint of rods 34 and the pushing of element 32 against the door as element 32 is withdrawn from chamber 42. As element 32 emerges from chamber 42, it enters and is caught by the fan discharge air stream. The catching of the emerging element 32 by the fan air stream results in the form of snap action wherein the fan air acts against element 32 to assist in pulling element 32 out of chamber 42 and rapidly drives element 32 to the full open position. Thrust reversal of the fan air then takes place with the fan air impinging on annular chute 32 being turned and directed as indicated by the arrows toward the front of the aircraft.

When it is desired to terminate thrust reversal, the reels 46 are actuated to wind up the portions of cords 48 extending from element 32 to chamber 42. Of course, any signal which may be present at actuators 52 to extend rods 54 is removed, and an appropriate signal may, if desired, be delivered to actuators 52 to move rods 54 in a retracting direction. As the cords 48 are wound up on reels 46, flexible fabric chute 32 is pulled into chamber 42 for storage. The pulleys 50 spaced around the periphery of the engine in storage chamber 42 serve as guides to prevent tangling or bunching of the chute as it moves into storage chamber 42. Also, the movement of element 32 is coordinated with rods 34 and door 44 so that the rods 34 come in contact with and start to close door 44 as the last part of chute 32 is entering into chamber 42. When chute 32 has been stored in chamber 42, the fan air from annular discharge chamber 26 then flows unimpeded in a rearward direction for the generation of forward thrust in the normal and well known manner.

Referring now to FIGURE 4, a modified version of the structure shown in FIGURE 3 is shown. The structure of FIGURE 4 differs from FIGURE 3 in two respects, one of which is that the door for closing opening 40 is in the form of a number of separate segments 44a attached to the ends of the tension rods 34 in the vicinity of the junction between the tension rods 34 and chute 32. The individual segments 44a may be fixed with respect to tension rods 34 or may be allowed a limited degree of motion relative to rods 34. In either event, when chute element 32 is pulled into storage chamber 42 the door elements 44a come together about the periphery of the engine and cooperate to form a closure for storage chamber 42.

In extending the chute 32 to the operative reverser position in the embodiment shown in FIGURE 4, the actuating structure of FIGURE 3 consisting of cylinders 52, rods 54 and collars 56 may also be provided for the FIGURE 4 structure. One alternative actuating structure for the FIGURE 4 embodiment may include a latching mechanism for holding the door segments 44a in a closed position. Upon release of the latching mechanism the segments 44a would then be slightly extended into the fan air stream from annulus 26, and the fan air stream would then catch the door segments and pull the reverser structure to the operative position.

The other respect in which the FIGURE 4 structure differs from the FIGURE 3 structure is in the inclusion of rollers 58 which are employed for the purpose of assisting in the folding of chute 32 for storage. Rollers 58 and their operation are best illustrated in FIGURE 5. The rollers 58 are located in pairs at points around the periphery of chamber 42 corresponding to the locations of guide pulleys 50. As can be seen in FIGURE 5, the rollers 58 are spaced apart on each side of a guide pulley 50, and the rollers 58 are spring loaded by springs 60 against the fabric element 32 as the fabric element is pulled into storage chamber 42. The action of the spring loaded rollers 58 against fabric element 32 causes element 32 to be pleated and folded as it is drawn into chamber 42 for storage.

Referring now to FIGURE 8, the larger diameter line 62 represents the configuration of the outermost portion of element 32 when element 32 is fully extended in the reversing position. As reverser element 32 is pulled into storage chamber 42 through the action of cords 48, the portions of the cords 48 which are secured to fabric element 32 cause fabric element 32 to scallop or pleat as indicated by the configuration of line 64 as element 32 is retracted into the storage chamber. Both the pleating resulting from the attachment of parts of the cords 48 to flexible element 32 and the pleating caused by the rollers 58 contribute to the neat and orderly retraction of fabric element 32 into chamber 42 for storage.

Referring now to FIGURE 6, another modified reverser structure is shown. As in the other embodiments, cylinders 52, rods 54 and collars 56 may be employed for actuation. The FIGURE 6 embodiment employs springs 66 disposed about the periphery of the engine for biasing door 44 to the open position shown. Biasing springs 66 may, as can be seen in FIGURE 3, also be used in other embodiments, and as previously described, rods 34 move door 44 to the closed position as the reverser structure is moved to the stowed position.

The most significant additional feature of the FIGURE 6 embodiment is the use of a fluted and overlapping fabric structure made up of flexible sheets 32a, 32b, 32c and 32d. Of course, the number of overlapping sheets may be varied as desired. The sheets 32a, 32b, 32c and 32d overlap each other as shown to provide air flow passages 68, 70, and 72. The air flow passages 68, 70 and 72 allow for the passage of unheated fan discharge air to the back side of each of the flexible sheets 32a, 32b and 32c, and this fan air passing to the back sides of the flexible elements flows along the back sides thereof and provides a cooling flow to protect the reverser structure from adverse effects that might otherwise result from impingement of hot exhaust gases from the main engine thrust reverser.

Referring now to FIGURE 7, the construction between segments 32b and 32c of the flexible reverser structure of FIGURE 6 is shown. The segments 32b and 32c of the flexible reverser structure are joined by labyrinth type rib structure 74 to provide a unitary structure so that the passage 70 is actually divided into a series of separate passages.

While a preferred embodiment of the present invention has been shown and described, various modifications and substitutions may be made without departing from the spirit and scope of this invention. Accordingly, it is to be understood that this invention has been described by way of illustration rather than limitation.

What is claimed is:

1. A thrust reverser for a propulsion engine having a fan section, said thrust reverser comprising;
    a flexible element positioned around said engine downstream of said fan section, said flexible element having an operative position wherein said flexible element is disposed in the path of gas exiting from said fan section to change the direction of flow of at least some of said gas;
    a plurality of tension rods spaced apart around the periphery of said engine, each of said tension rods being connected to said flexible element and being pivotably connected to said engine upstream of said operative position of said flexible element; and
    a storage chamber in said engine for housing said flexible element in a stowed position; and
    means attached to said flexible element for pulling on said flexible element to move said flexible element from said operative position to said stowed position.

2. A thrust reverser as in claim 1 wherein said fan section has a substantially annular discharge passage, and wherein said flexible element comprises a fabric material, said flexible element in said operative position forming a substantially annular chute for intercepting substantially the entire gas flow from said annular discharge passage.

3. A thrust reverser as in claim 1 wherein said pulling means includes a plurality of spaced apart chords, each of said chords having a portion secured to said flexible element and a portion extending from said flexible element, and wherein said pulling means further includes reel means connected to said chord means for reeling up said extending portions of said chord means.

4. A thrust reverser as in claim 1 wherein said flexible element comprises a fabric material, and including means for folding said flexible element during movement of said flexible element to said stowed position.

5. A thrust reverser as in claim 1 wherein said flexible element comprises a fabric material having front and back surfaces, the gas exiting from said fan section being incident on said front surface in said operative position of said flexible element, and wherein said flexible element further comprises at least one fluted section for the passage of gas through said flexible element to said back surface.

6. A thrust reverser as in claim 1 wherein said flexible element comprises a fabric material having front and back surfaces, the gas exiting from said fan section being incident on said front surface in said operative position of said flexible element, and wherein said flexible element further comprises a plurality of fluted overlapping sections for the passage of gas through said flexible element and along said back surface.

7. A thrust reverser as in claim 1 including means for moving said flexible element from said stowed position toward said operative position.

8. A thrust reverser for a gas turbine engine, said engine having a main engine housing and a fan section, said fan section having a substantially annular discharge passage for discharging gas around said main engine housing, said thrust reverser comprising:
    a fabric element, said fabric element having an operative position downstream of said fan section wherein said fabric element is extended in the form of an annular chute and is disposed in the path of gas exiting from said fan section;

a storage section in said main engine housing for storing said fabric element in a stowed position, said fabric element being normally in a stowed position in said storage section, closure means for closing said storage section during storage of said fabric element in said stowed position;

a plurality of tension rods spaced apart around the periphery of said main engine housing, each of said tension rods being connected to said fabric element and being pivotably connected to said main engine housing upstream of said operative position of said fabric element, said tension rods being normally disposed along said main engine housing, said normal position of said tension rods corresponding to said stowed position of said fabric element, and said tension rods extending from said main engine housing at an angle thereto when said fabric element is in said operative position;

means for actuating said closure means to open said storage section;

means for moving said fabric element from said stowed position to said operative position; and means attached to said fabric element for pulling on said fabric element to move said fabric element from said operative position to said stowed position.

9. A thrust reverser as in claim 8 wherein said pulling means includes a plurality of spaced apart chords, each of said chords having a portion secured to said fabric element and a portion extending from said fabric element, and wherein said pulling means further includes reel means connected to said chord means for reeling up said extending portions of said chord means.

10. A thrust reverser as in claim 9 including means for folding said fabric element during movement of said fabric element from said operative position to said stowed position.

11. A thrust reverser as in claim 10 wherein said folding means includes a plurality of spaced apart pairs of rollers in said storage chamber, springs connecting each of said rollers to walls of said storage chamber, and each of said pairs of rollers being spaced apart and straddling one of said chords.

12. A thrust reverser as in claim 8 wherein said closure means includes door means pivotably connected to said main engine housing.

13. A thrust reverser as in claim 8 wherein said closure means includes plate means connected to said tension rods, and wherein said means for moving said fabric element from said stored position to said operative position includes means connected to said tension rods for actuating said tension rods toward said angled position and opening said storage section.

14. A thrust reverser as in claim 8 wherein said means for moving said fabric element from said stowed position to said operative position includes means for placing part of said fabric element in the gas stream exiting from said annular discharge chamber to place a load on said part urging said fabric element toward said operative position.

15. A thrust reverser as in claim 8 wherein said fabric element comprises a fabric material having front and back surfaces, the gas exiting from said fan section being incident on said front surface in said operative position of said fabric element, and wherein said fabric element further comprises at least one fluted section for the passage of gas through said fabric element to said back surface.

16. A thrust reverser as in claim 8 wherein said fabric element comprises a fabric material having front and back surfaces, the gas exiting from said fan section being incident on said front surface in said operative position of said fabric element, and wherein said fabric element further comprises a plurality of fluted overlapping sections for the passage of gas through said fabric element and along said back surface.

References Cited

UNITED STATES PATENTS

| | | | |
|---|---|---|---|
| 2,936,582 | 5/1960 | Davidson | 244—113 X |
| 3,280,561 | 10/1966 | Kutney | 60—226 |
| 3,302,404 | 2/1967 | Gist | 60—230 |

CARLTON R. CROYLE, *Primary Examiner.*